United States Patent Office 3,223,520
Patented Dec. 14, 1965

3,223,520
METHOD FOR CONTROLLING THE REACTIONS IN AN ARC FURNACE
Jan-Erik Östberg, Surahammars Bruks Aktiebolag, Huvudkontoret, Surahammar, Sweden
No Drawing. Filed Nov. 5, 1962, Ser. No. 235,530
Claims priority, application Sweden, Nov. 8, 1961, 11,090/61
3 Claims. (Cl. 75—60)

This invention relates to a method of controlling the operation of an arc furnace in which gas-forming reactions take place, and in conjunction with this, to burn reaction gases and the combustible inpurities of the slag.

Up to now my large scale efforts to refine hot metal to steel in an arc furnace have met with great difficulties, particularly in those cases where the oxidizing agency has been mainly iron ore. A practical means to this end is described in my copending U.S. Patent application Serian No. 820,950, filed June 17, 1959, now abandoned. However, even if energy and ore are added in adequate proportions the reactions sometimes do not start. After some time, during which the action is in no relation to the additions made, the reaction does start sometimes with extraordinary violence. Before such an outburst the carbon reaction might degenerate a foaming. Characteristic of foaming is that small bubbles fill and expand the slag. Very often the foaming has already started in the steel bath, which is thereby also filled by small gas bubbles.

The volume of slag plus bubbles may be several times that of the slag proper, which fact causes a number of undesirable effects. One such effect is that the contact between the steel bath and the slag becomes less complete. Another disadvantage, which has a great bearing upon the reactions, is that the foaming slag prevents the heat from the electric arcs to radiate to the areas where the energy is needed. Furthermore the feed ore, particularly if it is fine grained may be caught in the slag and held there without any possibility of reaching contact with the steel bath.

There might be a number of different reasons for the foaming. Most of these reasons are however associated with a most important feature of the arc furnace, namely the fact that most things in it occur in an irregular manner. For one thing the energy is supplied by the arcs. This creates an extraordinary lack of uniformity. It is well known that procedure in the arc furnace may be modified drastically by changing the length of the arcs. This is performed by varying the arc voltage or arc current. The quantity of the slag also influences the surface of the arcs, which is free for radiation. The feeding of the iron ore is also bound to be local, particularly so if there are means for an automatic feeding. According to the method of the cited patent application the hot metal is teemed into the furnace at one place, creating a risk that gradients are formed with respect to another important factor, namely the carbon content.

Thus, in spite of the fact that all the factors which have a bearing upon the carbon reaction seem to be provided for, the reaction fails to develop. There might be in the furnace great quantities of carbon and oxygen. The power input might be sufficient. But all these things so necessary for the reaction are not present in the same area in a sufficient quantity. It is a particularly unhappy state of affairs if the temperature gradients are great. The energy for the endothermic carbon reaction is mainly required in order to melt the iron ore and to bring the oxygen into solution in the steel bath. The reaction easily comes to a stop if there is a deficiency of energy in those areas of the furnace where the iron ore is charged.

The present invention provides a suitable process for the correction of this lack of uniformity in those cases where the process does not automatically solve the problem by the violence of the boil. Surprisingly, it has been found that simultaneous to the solving of this problem a number of other benefits are gained. The process which achieves uniformity is by itself a way to knock down foaming mechanically. It offers the great advantage that the reaction gases are burnt in the furnace proper thus delivering for the process a most valuable quantity of energy. The invention presents in addition a method of regulating the oxygen potential in and above the slag.

The characteristic of the invention involves the introduction of one or more jets of air, oxygen, or a mixture of these gases or other oxygen containing gases into the furnace space. The jet, which will hereinafter be called the gas jet is introduced in an inclined direction into the slag surface or at a distance above the slag surface of no more than one foot. It is usually not desirable to oxidize the steel bath, and the gas jet shall for that reason be directed in such a way that contact with the steel bath is avoided. If there is such a reaction that there is no foaming and instead great bubbles are formed, the need for stirring is diminished because the stirring is provided for by the reaction itself. In this case the reaction is likely to throw slag and even steel up over the slag surface and there is a risk that the gas jet will oxidize the steel proper. The gas jet shall in this case be elevated to an almost horizontal or even more than horizontal direction in order to keep this oxidation at a minimum. Particularly when the gas jet is directed towards the slag it gives the slag a rotating movement and as a consequence the gradients in temperature and oxygen contents are equalized rapidly. The iron ore, which is fed into the furnace is thereby brought over a greater area and indirectly even the steel bath is influenced by the rotation. The rotary movement of the slag layer is governed by the momentum which the slag receives from the gas jet and is thus a function of the quantity of the gas and of the velocity of the gas when leaving the jet nozzle. To get a sufficient action the gas jet should be introduced at a pressure of at least 10 p.s.i. and the quantity used should amount at least to the amount required to burn at least ten percent of the carbon monoxide gas simultaneously produced in the furnace.

It is obvious that the desired effect may be achieved by various procedures in the introduction of the gas jets. It is also obvious that the momentum and stirring effect increases when greater quantities of gas are used and when higher gas pressure is used. On the other hand, the drawback of splashing might develop if too much gas is introduced in a limited area and particularly in large furnaces it is often desirable to give the slag a continuous acceleration. Because of such considerations the result is often improved if the quantity of gas is divided between more than one gas jet. A plurality of jets are best introduced in successive points tangentially around the furnace periphery. This manner of introducing the gas jets into the furnace is particularly advisable in case there is provision for only one gas outlet from the furnace.

In every way the direction of the stream of carbon-dioxide-containing gas in the furnace must be maintained at a distance from the hot electrodes in order to avoid extra electrode consumption. Such a risk is best avoided by the tangential direction of the gas jets above the slag-layer, which creates a rotation in the furnace atmosphere. This rotation of the atmosphere in turn creates a stationary area in the middle of the furnace around the electrodes, which are thus protected by a reducing gas atmosphere of their own. Extra gas jets may be necessary in order to guarantee a correct flow pattern.

Great benefits are gained by the simple principle of the invention, which is to create a rotating movement in the phases above the steel bath in the furnace thus homogenizing them. Further benefits are gained if the principle is applied to its logical end. In this case the furnace is closed except for one or more gas outlets. The gas from the gas jets is proportioned such that a quantity equivalent to ten percent of the carbon monoxide simultaneously developed in the furnace is injected in or just above the slag surface and the rest on a higher level. This latter gas quantity may be varied such that the final combustion of the reaction gases is more or less complete provided that the gas jets are introduced tangentially and that the furnace atmosphere is given a rotating movement. In this case even a slight excess of oxygen may be tolerated.

The principles, which are just explained can, by a man skilled in the art, be applied according to the conditions which he is facing. The following example of a practical use will illustrate this. In this example, the gas jets were introduced into a furnace where heavy foaming was taking place. The nominal angle of the gas jets towards the bath was about 60 degrees but the upward draft from the furnace proper and from the gases rising from the bath gave the gas jets a deviation sufficient to avoid any material oxidation of the bath. The slag got a good stirring. To start with, the nozzles of the gas jets were located 300 millimeters above the slag surface. Later on they were approached to the slag whereby the angle had to be decreased to about 45 degrees. In this example, a satisfactory effect was achieved by the use of one jet. In combination with air, which was leaking into the furnace, an almost complete combustion of the reaction gases was achieved. As a consequence of this the energy consumption dropped 75 kw.-hr. per ton of hot metal refined. The foaming was kept within limits. In addition to this the sulphur content of the metal was considerably reduced obviously because of the burning of sulphur to sulphur dioxide in zones around the gas jet.

The method according to the invention may be varied in a number of ways within the framework of the following claims.

I claim:
1. A method of controlling the reaction between carbon and oxygen in an electric arc furnace having a plurality of arc electrodes, for the manufacture of iron or steel, in which the carbon is oxidized with ore which is introduced into the furnace, under conditions which tend to cause foaming of the slag, to counteract the tendency to build up temperature and chemical composition gradients in the slag layer and to reduce slag foaming, which comprises introducing tangentially into the arc furnace, at a level at least as high as the upper part of the slag layer, at least one jet of an oxygen-containing gas, and maintaining the pressure, volume and angle of introduction of such gas at such values as to produce a rotating movement of the slag and the furnace atmosphere around the electrodes while preventing such displacement of the slag as to uncover the surface of the molten metal therebeneath, said rotating atmosphere leaving a substantially stationary area of gas in the area of the electrodes, the gas having a pressure of at least 10 p.s.i. and the jet forming an angle with the horizontal not exceeding 60°.

2. A process as claimed in claim 1 in which the jet is in a substantially horizontal plane.

3. A process as claimed in claim 1 in which the jet initially is spaced above the upper surface of the slag at an angle of about 60° to the horizontal and is thereafter moved downwardly while decreasing the angle to about 45°

References Cited by the Examiner
UNITED STATES PATENTS

| | | | |
|---|---|---|---|
| 723,501 | 3/1903 | Thofehrn | 75—60 X |
| 2,502,259 | 3/1950 | Hulme | 76—12 X |
| 2,558,104 | 6/1951 | Scharschu | 75—12 X |
| 2,644,746 | 7/1953 | Hauttmann | 75—60 |
| 3,015,554 | 1/1962 | Rummel | 75—60 |

FOREIGN PATENTS

| | | |
|---|---|---|
| 121,674 | 1/1919 | Great Britain. |

BENJAMIN HENKIN, *Primary Examiner.*